(12) United States Patent
Timberlake et al.

(10) Patent No.: US 9,221,948 B2
(45) Date of Patent: Dec. 29, 2015

(54) PHOSPHORUS-CONTAINING FLAME RETARDANTS

(71) Applicant: CHEMTURA CORPORATION, Middlebury, CT (US)

(72) Inventors: Larry D. Timberlake, West Lafayette, IN (US); Mark V. Hanson, West Lafayette, IN (US); Narayan Subramaniam, West Lafayette, IN (US); William R. Fielding, West Lafayette, IN (US); Matthew S. Burge, West Lafayette, IN (US)

(73) Assignee: Chemtura Corporation, Middlebury, CT (US)

( * ) Notice: Subject to any disclaimer, the term of this patent is extended or adjusted under 35 U.S.C. 154(b) by 0 days.

(21) Appl. No.: 14/486,224

(22) Filed: Sep. 15, 2014

(65) Prior Publication Data

US 2015/0005417 A1 Jan. 1, 2015

Related U.S. Application Data

(63) Continuation-in-part of application No. 12/776,593, filed on May 10, 2010, now Pat. No. 8,895,648.

(60) Provisional application No. 61/177,750, filed on May 13, 2009.

(51) Int. Cl.

| *C08K 5/5397* | (2006.01) |
|---|---|
| *C08G 65/48* | (2006.01) |
| *C08F 114/14* | (2006.01) |
| *C08L 77/06* | (2006.01) |
| *C08K 5/5313* | (2006.01) |
| *C08K 7/14* | (2006.01) |
| *C08L 77/00* | (2006.01) |

(52) U.S. Cl.
CPC .............. *C08G 65/48* (2013.01); *C08F 114/14* (2013.01); *C08K 5/5313* (2013.01); *C08K 5/5397* (2013.01); *C08L 77/06* (2013.01); *C08K 7/14* (2013.01); *C08L 77/00* (2013.01); *C08L 2201/02* (2013.01)

(58) Field of Classification Search
CPC ........................................................ C08G 65/48
USPC ........................................................ 524/115
See application file for complete search history.

(56) References Cited

U.S. PATENT DOCUMENTS

| 3,341,625 | A | 9/1967 | Gillham et al. |
|---|---|---|---|
| 3,681,281 | A | 8/1972 | Juelke et al. |
| 4,061,681 | A | 12/1977 | Hillard et al. |
| 4,293,464 | A | 10/1981 | Granzow |
| 4,341,696 | A | 7/1982 | Braksmayer et al. |
| 7,332,534 | B2 | 2/2008 | Knop et al. |
| 7,411,013 | B2 | 8/2008 | Harashina et al. |
| 8,420,719 | B2 * | 4/2013 | Timberlake .......... C08K 5/5397 524/101 |
| 8,895,648 | B2 * | 11/2014 | Timberlake .......... C08K 5/5397 524/115 |
| 2002/0010237 | A1 * | 1/2002 | Heinen et al. ................. 524/100 |
| 2006/0074154 | A1 * | 4/2006 | Harashina ................ C08K 5/51 524/115 |

FOREIGN PATENT DOCUMENTS

| WO | WO 2009/094241 A2 | 7/2009 |
|---|---|---|
| WO | WO 2010/132332 A1 | 11/2010 |

OTHER PUBLICATIONS

*Phosphorus Based Additives for Flame Retardant Polyester. I. Low Molecular Weight Additives.* By Robert W. Stackman. Journal American Chemical Society. p. 328-331. Ind.Eng.Prod. Res.Dev. vol. 21, No. 2 (1982).

* cited by examiner

*Primary Examiner* — Doris Lee
(74) *Attorney, Agent, or Firm* — Dilworth IP LLC

(57) ABSTRACT

A flame-retardant resin composition comprises a base resin (A), such as a polyamide resin, and an aromatic organophosphorus oligomer or polymer.

20 Claims, No Drawings

PHOSPHORUS-CONTAINING FLAME RETARDANTS

This application is a continuation in part of U.S. patent application Ser. No. 12/776,593, filed May 10, 2010 and which claims the benefit of the filing date of U.S. Provisional Application No. 61/177,750 filed May 13, 2009, the entire contents of each disclosure are incorporated herein by reference.

FIELD

This invention relates to phosphorus-containing flame retardants particularly, but not exclusively for glass-filled polyamide resins.

BACKGROUND

With current and future market requirements for electrical components trending toward lighter weight plastic parts with improved electrical and mechanical properties, there is a substantial growth in the use of engineering plastics for electronic applications. At the present time, polyamides are the dominant engineering thermoplastic for electronic and other applications, especially when reinforced with a glass filler to increase their structural and impact strength and rigidity.

Polyamides are, in general, characterized as being relatively thermally stable upon long exposure to processing temperatures and shear. Upon exposure to flame, however, they burn quite readily, with the flammability being characterized by a dripping behavior of the burning resin. There is therefore a substantial and increasing demand for flame retardant polyamides and especially flame retardant glass-filled polyamides. Likewise, there is also demand for their polyester resin cousins, typically glass reinforced, with the choice of resin being dependent on several factors such as a balance between cost and mechanical property performance.

One of the major classes of flame retardants for thermoplastics and polyurethane foams is that of organic phosphorus compounds (typically phosphates and phosphonates). These may be non-halogenated or may include phosphorus-halogen compounds and blends of phosphorous compounds with halogenated flame retardants, typically brominated flame retardants.

In general organic phosphorus compounds provide fire retardant activity through a combination of condensed phase reactions, vapor phase reactions, polymer carbonization promotion, and/or char formation. These processes obviously depend on the polymer in which such additive(s) reside. Therefore, specific phosphorus containing structures need to be designed for various polymers types.

For example, U.S. Pat. No. 3,681,281 discloses a shaped structure comprising a polyester, at least 1 percent by weight of the polyester of a tertiary phosphine oxide, and from about 10 to about 50 percent by weight of the tertiary phosphine oxide of a synergist selected from the group consisting of triphenylmelamine, benzil and dibenzyl. Among the tertiary phosphine oxides exemplified is xylylene bis-diphenylphosphine oxide.

In an article entitled "Phosphorus based additives for flame retardant polyester. 1. Low molecular weight additives", Industrial & Engineering Chemistry Product Research and Development, (1982), 21(2), pages 328-31, Robert W Stackman evaluates various phosphorus-containing organic compounds, including xylylene bis-diphenylphosphine oxide, as flame retardants for poly(ethylene terephthalate) and poly(1,4-butylene terephthalate). The evaluation includes the effect of the additives on melt stability of preformed polymers as well as the effect upon flammability of films, as determined by a non-standard bottom burn, oxygen index method. The oxygen index values for these blends were a function of the phosphorus content of the blend. The efficiency of the phosphorus compounds as flame retardants changed as the nature of the phosphorus structure changed, with the order R3PO>R(R'O)2PO>(R'O)3PO. Polymeric additives were reported to be attractive additives, giving a combination of a high degree of flame retardancy combined with a minor degree of property degradation on blending, even at <20 wt % of the blend.

Other organic phosphorus compounds have also been suggested for use as flame retardants for polyamides. For example, Research Disclosure 168051 (published April 1978) entitled "Improved Nylon" describes a flame-resistant nylon fiber prepared by coating flakes of bis(4-aminocyclohexyl)methane-dodecanedioic acid copolymer with 8-10% p-xylylenebis(diphenylphosphine oxide) flame retardant and spinning a yarn using a screw melter equipped with a homogenizing, in-line mixer to supply the molten polymer to a unit for producing a 34-filament yarn. The molten polymer was heated to 300-10° and the holdup time was approximately 15 min. The yarn was drawn 2.3 times on a hot pipe to produce a 100-denier yarn.

In addition, U.S. Pat. No. 4,341,696 discloses a glass filled thermoplastic polyamide polymer rendered flame retardant by having combined therewith an effective amount of a tris-(3-hydroxyalkyl)phosphine oxide having the formula:

$$\underset{\text{(HOCHCHCH)}_3\text{PO}}{R_1 \; R_2 \; R_3}$$

wherein $R_1$ and $R_3$ are any radical selected from the group consisting of hydrogen, phenyl and alkyl radicals of 1 to 4 carbon atoms and R2 is any radical selected from the group consisting of hydrogen, phenyl and alkyl radicals of 2 to 4 carbon atoms, provided that when $R_1$ and $R_3$ are hydrogen radicals, R2 is either an alkyl radical of 2 to 4 carbon atoms or a phenyl radical.

U.S. Pat. No. 7,332,534 discloses a flame retardant formulation for thermoplastic and thermoset polymers, including polyesters and polyamides, containing, as flame retardant component A, from 90 to 99.9% by weight of phosphinate salt of the formula:

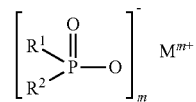

and/or a diphosphinate salt of the formula

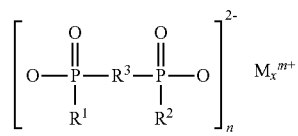

and/or polymers thereof, where R1, R2 are the same or different and are each C1-C6-alkyl, linear or branched, and/or aryl; R3 is C1-C10-alkylene, linear or branched, C6-C10-arylene, -alkylarylene or -arylalkylene; M is Mg, Ca, Al, Sb, Sn, Ge, Ti, Zn, Fe, Zr, Ce, Bi, Sr, Mn, Li, Na and/or K; m is from 1 to 4; n is from 1 to 4; x is from 1 to 4 and, as component B, from 0 to 50% by weight of a nitrogen-containing synergist or of a phosphorus/nitrogen flame retardant and, as component C, from 0.1 to 10% by weight of a liquid component.

U.S. Pat. No. 7,411,013 discloses a flame-retardant resin composition comprising a base resin (A), such as a polyester, polyamide or styrenic resin, an organic phosphorus compound (B) and a flame-retardant auxiliary (C), wherein the organic phosphorus compound (B) has a unit represented by the following formula:

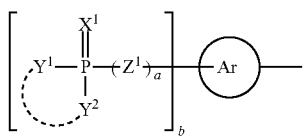

wherein Ar represents an aromatic hydrocarbon ring or a nitrogen-containing aromatic heterocycle; X1 represents an oxygen atom or a sulfur atom; Y1 and Y2 are the same or different and each represents a hydrocarbon group, an alkoxy group, an aryloxy group, or an aralkyloxy group; Z1 represents an alkylene group, or a nitrogen-containing bivalent group corresponding to an alkylamine; Y1 and Y2 may bind to each other, and Y1 and Y2 together with the adjacent phosphorus atom may form a ring; "a" denotes 0 or 1; and "b" denotes an integer of 1 to 6.

According to the present invention, it has now been found that certain benzyl-substituted phosphorus oxide compounds, especially when combined with specific synergists, are highly effective flame retardants for thermoplastic resins, including polyamides, especially glass filled polyamides.

SUMMARY

Accordingly, the invention resides in one aspect in a flame-retardant resin composition comprising a base resin (A), an organophosphorus compound (B) comprising a unit represented by at least one of the following formulas (I), (Ia), (II) and (III):

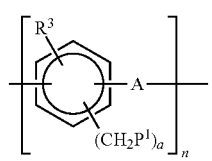

(I)

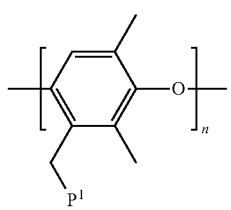

(Ia)

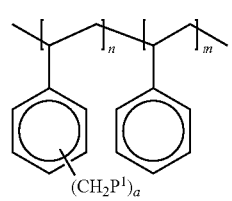

(II)

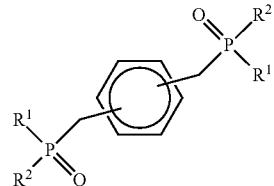

(III)

where A is selected from O, S, $SO_2$, a single bond, alkyl, and $—CH_2—P^1$; $P^1$ is a phosphorus-containing group of the formula:

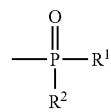

$R^1$ and $R^2$ are the same or different and each is selected from H, O-alkyl, O-aryl, alkyl, aryl, and OM,
or $R^1$, $R^2$ and the phosphorus atom to which they are bound are encompassed by a ring, for example, $R^1$ and $R^2$ together with a group Y form a group $R^1—Y—R^2$, wherein $R^1$ and $R^2$ are the same or different and each is selected from O-alkyl, O-aryl, alkyl and aryl, and Y is a linking group selected from direct bond, alkylene and —O—, e.g., Y is a direct bond, as in the formula:

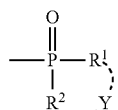

$R^3$ is H or alkyl;
M=Na, K, Zn, Al, Ca;
each a is an integer individually selected from 0 to 4, e.g., 0 1, 2, 3, or 4 provided that at least one a is at least 1;
n is an integer from 1 to 100,000, e.g., 2, 3, 4 or 5 to 100,000 and m is an integer from 0 to 100,000, e.g., 1, 2, 3, 4 or 5 to 100,000;
and
optionally at least one flame retardant adjuvant material (C).

In one particular embodiment, the organophosphorus compound (B) comprises a unit represented by at least one of the formulas (I), (Ia) or (II) with the proviso that $R^1$ and $R^2$ are not both unsubstituted phenyl.

It should be understood that in formula (I), (Ia) and (II), where n is 2, 3, 4, 5 or higher, each of the individual variables A, $R^1$, $R^2$, $R^3$, Y, M or a for each unit of Formula (I), (Ia) or (II) may be the same or different. For example, a polymer comprising monomer units of Formula (I) can contain monomer units of Formula (I) where the variable 'a' is 1, and monomer units of Formula (I) where the variable 'a' is 0, resulting in a polymer comprising phenyl rings linked by a group A, wherein some of the phenyl rings are substituted by a group $(CH_2P^1)$ and some of the phenyl rings are not substituted by a group $(CH_2P^1)$.

Conveniently, the organophosphorus compound (B) is present in an amount of about 10% to about 40%, e.g., 10% to about 30%, by weight of the flame-retardant resin composition.

Conveniently, at least one flame retardant adjuvant material (C) is present and is selected from melamine, a melamine derivative such as a melamine condensation product or melamine salt, an inorganic metal compound, a clay material, a layered double hydroxide material, and a polyphenylene ether resin.

Conveniently, the at least one flame retardant adjuvant material (C) comprises a melamine salt and an inorganic metal compound in a weight ratio of between about 10:1 and about 1:1 or a condensation product of melamine and an inorganic metal compound in a weight ratio of between about 10:1 and about 1:1.

Conveniently, the inorganic metal compound comprises a metal salt such as a borate, particularly zinc borate.

Conveniently, the melamine salt comprises a melamine phosphate, particularly melamine polyphosphate or melamine pyrophosphate; the condensation product of melamine conveniently comprises melam, melem or melon.

Conveniently, the at least one flame retardant adjuvant material (C) is present in an amount of about 1 to about 20 wt % of the flame-retardant resin composition. For example, the combination of the organophosphorus compound (B) and the at least one flame retardant adjuvant material (C) may make up from 11 to 60 wt % of the total composition, e.g., from 11 to 50 wt % or from 15 to 40% of the total composition.

Conveniently, the base resin (A) comprises at least one of a thermoplastic or thermoset resin. A typical thermoset resin is an epoxy resin and a typical thermoplastic resin is polyester, a polyamide, a polycarbonate or a styrenic resin.

In one embodiment, the base resin (A) comprises a polyamide and particularly a glass-filled polyamide, typically containing from about 15 to about 40% glass by weight of the total weight of the polyamide and glass.

DESCRIPTION OF THE EMBODIMENTS

Described herein is a flame-retardant resin composition comprising a base resin (A), a benzylic-substituted organophosphorus compound (B) and optionally at least one flame retardant adjuvant material (C).

Base Resin

The base resin can be any organic macromolecular material, such as a polyester-series resin, a styrenic resin, a polyamide-series resin, a polycarbonate-series resin, a vinyl-series resin, an olefinic resin, an acrylic resin, an epoxy resin, a blend of two or more of said resins or a blend of one or more of said resins with a polyphenylene oxide-series resin. The base resin can be a thermoplastic or a thermoset resin and in some embodiments further comprise a reinforcing agent, e.g., a glass reinforced resin. Particularly preferred are engineering resins, such as polyester-series resins, polyamide-series resins and polycarbonates, especially glass-filled polyesters and polyamides.

Polyester-series resins include homopolyesters and copolyesters obtained by, for example, polycondensation of a dicarboxylic acid component and a diol component, and polycondensation of a hydroxycarboxylic acid or a lactone component. Preferred polyester-series resins usually include a saturated polyester-series resin, in particular an aromatic saturated polyester-series resin, such as polybutylene terephthalate.

Polyamide-series resins include polyamides derived from a diamine and a dicarboxylic acid; polyamides obtained from an aminocarboxylic acid, if necessary in combination with a diamine and/or a dicarboxylic acid; and polyamides derived from a lactam, if necessary in combination with a diamine and/or a dicarboxylic acid. The polyamide also includes a copolyamide derived from at least two different kinds of polyamide constituent components.

Suitable polyamide-series resins include aliphatic polyamides (such as nylon 46, nylon 6, nylon 66, nylon 610, nylon 612, nylon 11 and nylon 12), polyamides obtained from an aromatic dicarboxylic acid (e.g., terephthalic acid and/or isophthalic acid) and an aliphatic diamine (e.g., hexamethylenediamine, nonamethylenediamine), and polyamides obtained from both aromatic and aliphatic dicarboxylic acids (e.g., both terephthalic acid and adipic acid) and an aliphatic diamine (e.g., hexamethylenediamine), and others. These polyamides may be used singly or in combination.

The base resin may be composited with a filler to modify its properties, such as mechanical strength, rigidity, thermal stability and electrical conductivity. The filler may be fibrous or non-fibrous. Suitable fibrous fillers include glass fibers, asbestos fibers, carbon fibers, silica fibers, fibrous wollastonite, silica-alumina fibers, zirconia fibers, potassium titanate fibers, metal fibers, and organic fibers having high melting point (e.g., an aliphatic or aromatic polyamide, an aromatic polyester, a fluorine-containing resin, an acrylic resin such as a polyacrylonitrile). Suitable non-fibrous fillers include plate-like (or layered) fillers, such as kaolin, talc, glass flakes, mica, graphite, metal foil, and layered phosphates (e.g., zirconium phosphate, and titanium phosphate). In addition, particulate or amorphous fillers can be used including carbon black, white carbon, silicon carbide, silica, powdered quartz, glass beads, glass powder, milled fibers (such as milled glass fiber), silicates (e.g., calcium silicate, aluminum silicate, clays, diatomites), metal oxides (e.g., iron oxide, titanium oxide, zinc oxide, and alumina), metal carbonates (e.g., calcium carbonate and magnesium carbonate), metal sulfates (e.g., calcium sulfate and barium sulfate), and metal powders.

Preferred fillers include glass fiber and carbon fiber. In one embodiment, the base resin comprises a glass-filled polyamide containing about 15 and about 40% glass fiber by weight of the total weight of the polyamide and glass.

Organophosphorus Compound

The organophosphorus compound employed in the present flame-retardant resin composition can be represented by at least one of the following formulas (I), (Ia), (II) and (III):

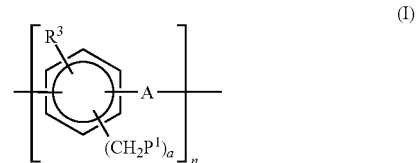

(I)

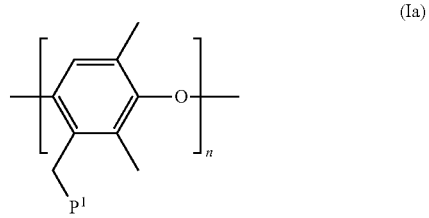

(Ia)

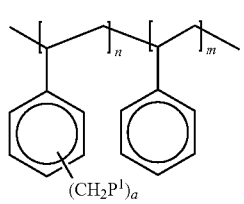

(II)

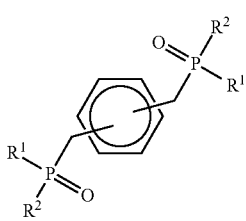

(III)

where A is selected from O, S, SO$_2$, a single bond, alkyl, and —CH$_2$—P$^1$;
P$^1$ is a phosphorus-containing group of the formula:

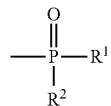

R$^1$ and R$^2$ are the same or different and each is selected from H, O-alkyl, O-aryl, alkyl, aryl, and OM,
or R$^1$, R$^2$ and the phosphorus atom to which they are bound are encompassed by a ring, for example, that is, R$^1$ and R$^2$ together with a group Y form a group R$^1$—Y—R$^2$, which together with the phosphorus atom bound to R$^1$ and R$^2$ form a ring:

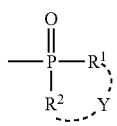

in which
R$^1$ and R$^2$ are the same or different and each is selected from O-alkyl, O-aryl, alkyl and aryl, and
Y is a linking group selected from direct bond, alkylene and —O—, e.g., Y is a direct bond;
R$^3$ is H or alkyl;
M=Na, K, Zn, Al, Ca;
each a is an integer individually selected from 0 to 4, e.g., 0 1, 2, 3, or 4 provided that at least one a is at least 1;
n is an integer from 1 to 100,000, e.g., 2, 3, 4 or 5 to 100,000 and m is an integer from 0 to 100,000, e.g., 1, 2, 3, 4 or 5 to 100,000, e.g., n is an integer from 4 to 100,000, or 5 to 100,000, and m is an integer from 1 to 100,000.

In one particular embodiment, the organophosphorus compound (B) comprises a unit represented by at least one of the formulas (I), (Ia) or (II) with the proviso that R$^1$ and R$^2$ are not both unsubstituted phenyl.

Representative benzylic-substituted organophosphorus compounds within the above formulas include diphenylphosphine oxide derivatives of diphenyl ether (Compound V below), diphenylphosphine oxide derivatives of diphenoxybenzenes (Compound VI below), diphenylphosphine oxide derivatives of oligomeric aryl ethers (Compound VII below), diphenylphosphine oxide derivative of polyphenylene ethers (Compound VIII below), diphenylphosphine oxide derivatives of polystyrene (Compound IX below), and p-xylylenebis(diphenylphosphine oxide) (Compound X below) and the corresponding cyclic phosphinates shown:

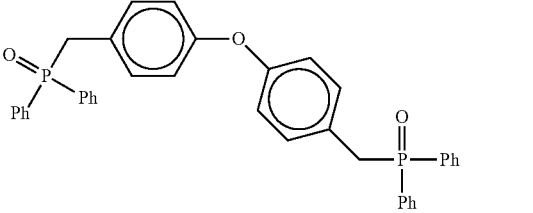

(V)

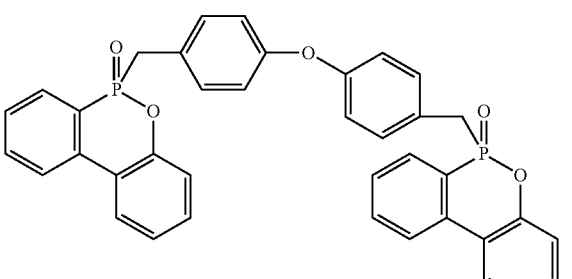

(Va)

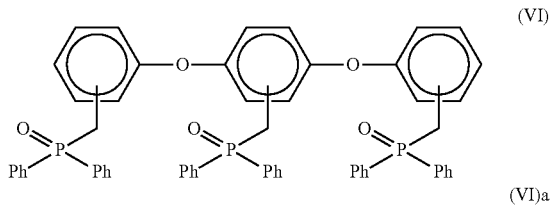

(VI)

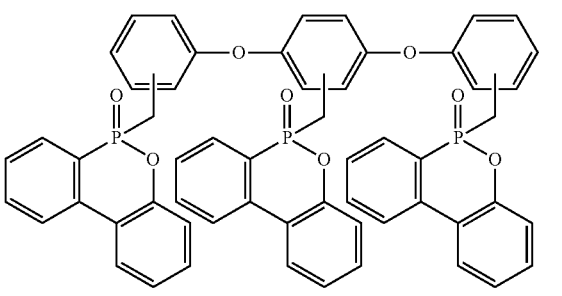

(VI)a

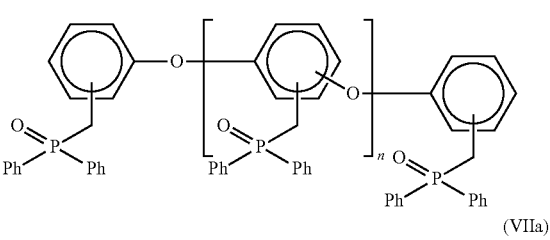

(VII)

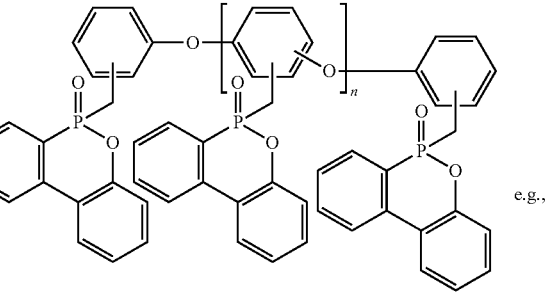

(VIIa)

e.g.,

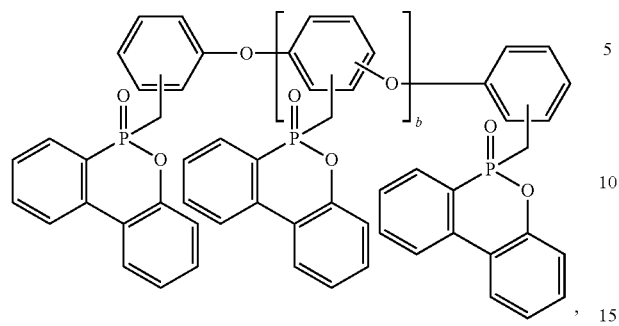
(VIIb)

wherein b is 2 or 3

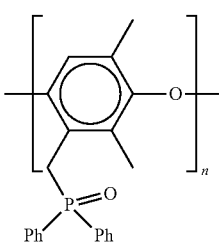
(VIII)

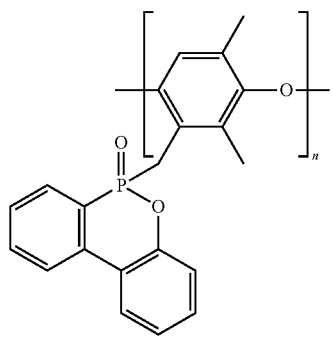
(VIIIa)

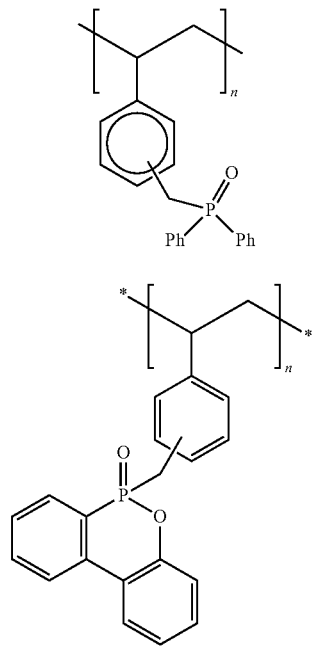
(IX)
(IXa)

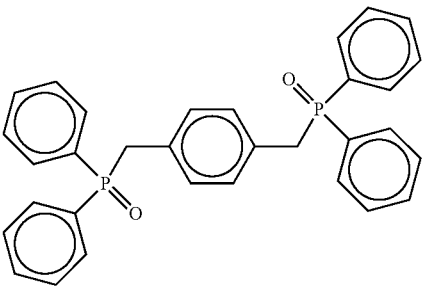
(X)

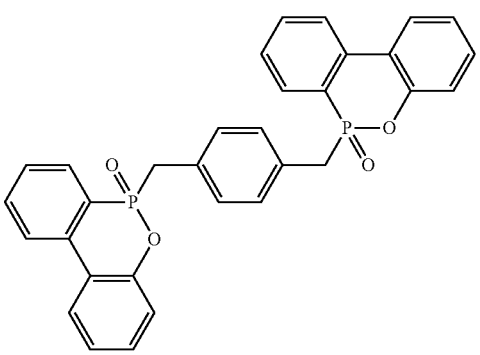
(Xa)

Conveniently, the organophosphorus compound (B) is present in an amount of about 10% to about 40%, e.g., 10% to about 30%, by weight of the flame-retardant resin composition.

Flame Retardant Adjuvant

To enhance its flame retardant properties, the present resin composition can include at least one flame retardant adjuvant material in addition to the organophosphorus compound described above. Suitable flame retardant adjuvant materials comprise melamine and melamine derivatives such as melamine salts and condensation products of melamine, inorganic metal compounds, clay compounds, layered double hydroxide materials, polyphenylene ether resins and mixtures thereof.

Suitable melamine salts include salts of melamine itself as well as salts of melamine derivatives, such as substituted melamines (e.g., an alkylmelamine such as 2-methylmelamine, guanylmelamine), condensation products of melamine (e.g., melam, melem, melon), and copolycondensed resins of melamine (e.g., melamine-formaldehyde resins, phenol-melamine resins, benzoguanamine-melamine resins and aromatic polyamine-melamine resins). Generally the salts are produced by reaction of the melamine with an oxygen-containing acid, such as nitric acid, a chloric acid (such as perchloric acid, chloric acid, chlorous acid, hypochlorous acid), a phosphorous acid, a sulfuric acid, a sulfonic acid, a boric acid, a chromic acid, an antimonic acid, a molybdic acid, a tungstic acid, stannic acid, or silicic acid.

Examples of suitable melamine salts include melamine orthophosphate, melamine phosphate, melamine pyrophosphates (including melamine pyrophosphate and dimelamine pyrophosphate), melamine polyphosphates (including melamine triphosphate and melamine tetraphosphate), melamine sulfates (including melamine sulfate, dimelamine sulfate and guanylmelamine sulfate), melamine pyrosulfates (e.g., melamine pyrosulfate and dimelamine pyrosulfate), melamine sulfonates (e.g., melamine methanesulfonate, melam methanesulfonate, and melem methanesulfonate) and melamine orthoborates (e.g., mono- to trimelamine orthoborates).

The preferred melamine salts are melamine pyrophosphates. Preferred condensation products of melamine comprise melam, melem or melon.

Suitable inorganic metal compounds for use in the present synergist combination include metal salts of inorganic acids, metal oxides and hydroxides, and metal sulfides.

Where the inorganic metal compound is a metal salt of an inorganic acid, suitable inorganic acids include phosphorous acids (such as orthophosphoric acid, metaphosphoric acid, phosphorous acid, hypophosphorous acid, hypophosphoric, pyrophosphoric acid, polyphosphoric acids, anhydrous phosphoric acid and polymetaphosphoric acid), boric acids (such as orthoboric acid, metaboric acid; pyroboric acid, tetraboric acid, pentaboric acid and octaboric acid), a stannic acid (such as stannic acid, metastannic acid, orthostannic acid and hexahydroxostannic acid), a molybdic acid, and a tungstic acid.

Examples of suitable metal salts include calcium pyrophosphate, calcium polymetaphosphate, alkaline earth metal hydrogenphosphates (such as magnesium hydrogen orthophosphate and calcium hydrogen orthophosphate); transition metal hydrogenphosphate (such as manganese hydrogenphosphate, iron hydrogenphosphate, zinc hydrogenphosphate and cadmium hydrogenphosphate); a hydrogenphosphate of a metal of Group 13 of the Periodic Table of Elements (such as aluminum hydrogenphosphate); a hydrogenphosphate of a metal of Group 14 of the Periodic Table of Elements (such as tin hydrogenphosphate), an alkaline earth metal borate (such as calcium orthoborate, calcium metaborate, calcium pyroborate and trimagnesium tetraborate); a transition metal borate (such as manganese orthoborate, manganese tetraborate, nickel diborate, copper metaborate, zinc metaborate, zinc tetraborate, cadmium metaborate and cadmium tetraborate), an alkali metal stannate (e.g., sodium stannate and potassium stannate), an alkaline earth metal stannate (e.g., magnesium stannate), a transition metal stannate (e.g., cobalt stannate and zinc stannate), zinc molybdate and zinc tungstate.

Examples of suitable metal oxides and hydroxides include molybdenum oxide, tungstic oxide, titanium oxide, zirconium oxide, tin oxide, copper oxide, zinc oxide, aluminum oxide, nickel oxide, iron oxide, manganese oxide, antimony trioxide, antimony tetraoxide, antimony pentoxide, aluminum hydroxide, magnesium hydroxide, tin hydroxide, and zirconium hydroxide. Mixed oxides such as aluminosilicates, including clays, can also be used.

Examples of suitable metal sulfides include molybdenum sulfide, tungstic sulfide and zinc sulfide. The preferred inorganic metal compounds are borates and particularly zinc borates.

In one embodiment, the flame retardant adjuvant is a combination of a melamine salt and an inorganic metal compound in a weight ratio of between about 10:1 and about 1:1. In another embodiment, the flame retardant adjuvant comprises a combination of a melamine condensation product and an inorganic metal compound in a weight ratio of between about 10:1 and about 1:1.

In another embodiment, the flame retardant adjuvant material is a char-forming organic compound such as a polyphenylene ether (PPE) type resin. A specific PPE resin example would be PPO 803 from Sabic Innovative Plastics. The PPE resin can be used typically at a load level of up to 50%, e.g., between about 1% and about 25%, more typically between about 5% and about 15%.

The invention will now be more particularly described with reference to the following

EXAMPLES

Example 1

Preparation of Diphenylphosphine Oxide Derivative of Diphenyl Ether

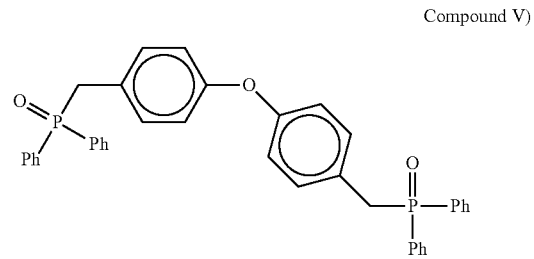

(Compound V)

Diphenyl ether (100 g), 50 g of paraformaldehyde, and 400 mL of acetic acid were stirred at 60° C. HCl (304 g) was bubbled through the solution over 5 hour. After aqueous workup in methylene chloride, and concentration of the organics, 146.1 g of a clear liquid was obtained. $^1$H NMR spectrum was consistent with the structure shown and indicated the material was predominantly the para isomer. The clear liquid (120 g), 356 g of ethyl diphenylphosphinite, and 500 g of dichlorobenzene were stirred at 165° C. overnight. The product was isolated by crystallization and repeated digestion/washing to give compound V (137.0 g) as a white solid. Analysis: TGA 5% wt loss: 342° C.; 10.3% P; DSC (melt): 274.4, 279.2° C.

Example 2

Preparation of Diphenylphosphine Oxide Derivative of Diphenoxybenzene

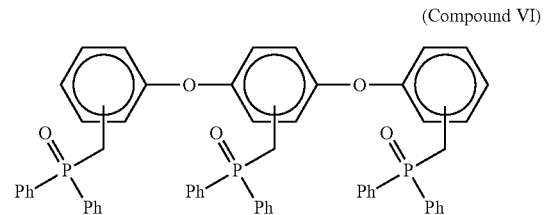

(Compound VI)

Diphenoxybenzene (100 g), paraformaldehyde (45.6 g), 33% HBr in acetic acid (748 g) and methylene bromide (632 g) were stirred at 60° C. for several hours, then 90° C. overnight. After aqueous workup and concentration, 214.7 g of a thick amber liquid was obtained. The thick amber liquid (210 g), ethyl diphenylphosphinite (439 g), and 1,2-dichlorobenzene (2 L) were heated at 160° C. overnight. A Dean-Stark trap was used to remove the volatiles. After cooling to room temperature, the reaction material was filtered. The white powder obtained was slurried in hexanes at room temperature and gave 162 g of material after drying. The white powder product (135 g) was washed with acetone and gave, after filtration and drying, 95.0 g of Compound VI as a solid. Analysis: TGA 5% loss: 290.9° C.; 9.85% P.

Example 3

Preparation of Diphenylphosphine Oxide Derivative of Oligomeric Aryl Ether

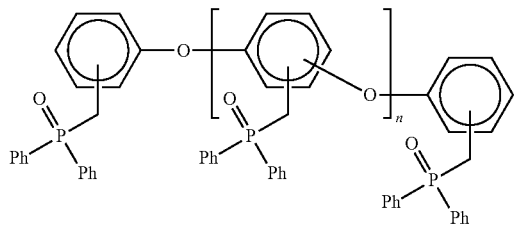

(Compound VII)

Compound 1C was produced using a modification of a procedure described in German Patent Publication No DE 3,334,068 A1. Poly(phenylene ether) oligomers (90.0 g; n=0-2), 54.95 g paraformaldehyde, 901 g 33% HBr in acetic acid, and 900 g of dibromomethane were heated with stirring for 4.5 hour at 60° C. The reaction mixture was then brought to 90° C. and held at that temperature overnight. The reaction mixture was then washed and the organics were concentrated under vacuum to afford 194.1 g of a brown solid intermediate. Analysis: Organic bromide: 46.78%; $^1$H NMR (CDCl3): δ 7.54-6.64 (m); 4.64-4.41 (m).

The brown solid intermediate (186.9 g), 304 g of ethyl diphenylphosphinite, and 3 L of 1,2-dichlorobenzene were heated at 160° C. under a blanket of nitrogen overnight with stirring. The volatiles were removed by use of a Dean-Stark trap. The reaction material was concentrated under vacuum. The concentrate (256.6 g) was heated with stirring with 256 g of 1,2-dichlorobenzene and 56 g of ethyl diphenylphosphinite at 175° C. overnight. The reaction mixture was then cooled to room temperature and then reprecipitated with hexanes. After filtration and vacuum drying, 251 g of Compound VII was obtained as a white solid. Analysis: TGA 5% loss: 314.2° C. 10.26% P; $^{31}$P NMR (CDCl3): δ −21.70 (m).

Example 4

Preparation of Diphenylphosphine Oxide Derivative of Substituted Polyphenylene Ether

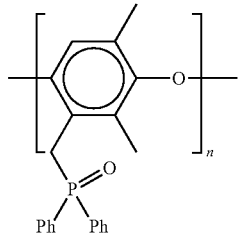

(Compound VIII)

A polyphenylene ether resin (PPO 803 resin from GE Plastics) (45 g), 22.5 g of paraformaldehyde, 367.4 g of 33% HBr in AcOH, and 150 g of methylene bromide were stirred and heated at 60° C. overnight. After workup the organics were precipitated into acetone. Upon drying, 78.9 g of a white powder was obtained. Analysis: $^1$H NMR (CDCl3): δ 6.07 (m), 4.75 (m), 4.2-1.90 (m). The white powder (70.0 g), 151.3 g of ethyl diphenylphosphinite, and 1,2-dichlorobenzene (2 L) were heated at 160° C. overnight. A Dean-Stark trap was used to remove the volatiles. The reaction mixture was then concentrated to half volume by distillation. The concentrated reaction mixture was precipitated with acetone and then reprecipitated. After filtration and drying, Compound VIII, 93.1 g, was obtained as a white powder. Analysis: TGA 5% loss: 353.1° C.; 8.73% P.

Example 5

Preparation of Diphenylphosphine Oxide Derivative of Polystyrene

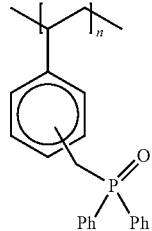

(Compound IX)

Poly(vinyl benzyl chloride) (77.5 g), 349 g of ethyl diphenylphosphinite, and 430 g of 1,2-dichlorobenzene were heated at 160° C. under a blanket of nitrogen overnight with stirring. The volatiles were removed by use of a Dean-Stark trap. The reaction mixture was taken up in 300 mL of methylene chloride and the product precipitated with of hexanes and then reprecipitated. After washing, filtration, and drying, compound IX was obtained as 138 g of a tan powder. Analysis: DSC (Tg): 125.7° C.; TGA 5% loss: 350.2° C.; 9.58% P.

Example 6

Preparation of P-Xylylenebis(Diphenylphosphine Oxide)

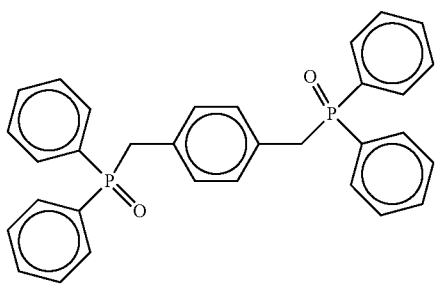

(Compound X)

Compound 3A was produced using a modification of a procedure described by Bodrin, G. V. et al., Inst. Elementoorg. Soedin. Moscow, USSR. Izvestiya Akademii Nauk SSSR, Seriya Khimicheskaya 1979, (11), 2572-5. Ethyl diphenylphosphinite (522 g), 180 g of α,α'-dichloro-p-xylene, and 2,400 g of 1,2-dichlorobenzene were stirred with heating at 160° C. under a blanket of nitrogen overnight. The volatiles were removed by use of a Dean-Stark trap. The mixture was then allowed to cool to room temperature and was filtered. The resulting wet-cake was washed with hexanes. After filtration and then vacuum drying, Compound X was obtained as 487 g of a white powder. Analysis: TGA 5% loss: 365° C.; 12.0% P.

Example 7

Use of Flame Retardants in Glass-Reinforced PA66

The various flame retardant compounds described in Examples 1 to 6 were formulated with PA66 resin by mixing the materials either with a twin screw extruder using a PA66 glass concentrate to produce a target 30% glass fiber reinforcement or in a vented Brabender Preparation Center. In the Brabender Preparation Center the samples were compounded for four minutes at 265° C. About 3 minutes after the start of mixing, glass fiber was added over a period of about 15 seconds to produce a target 30% glass fiber reinforcement. The compounded materials were ground on a Thomas Wiley mill and then molded by using a small injection molding machine at 265° C. to form 1/16" thick UL-94 test bars.

The test bars were subjected to the UL-94 vertical burn test protocol in which a bar is subjected to two 10 second flame applications. The time for the bar to extinguish after each application is noted and reported as Time 1 (T1) and Time 2 (T2) for the bar. The average burn times for 5 test bars were noted for both flame applications (T1, T2). The total burn times were also summed for each of the two flame applications across all five test bars along with the observations of any dripping behavior. The results are shown in Table 1.

TABLE 1

| Formulation | 1 | 2 | 3 | 4 | 5 | 6 |
|---|---|---|---|---|---|---|
| % PA 66 Resin | 30.2 | | | | 50 | 40 |
| % Zytel 70G43L Resin(a) | 69.8 | 70 | 70 | 70 | | |
| % Glass | | | | | 30 | 30 |
| Compound V | | 30 | | | | |
| Compound VI | | | 30 | | | |

TABLE 1-continued

| Formulation | 1 | 2 | 3 | 4 | 5 | 6 |
|---|---|---|---|---|---|---|
| Compound VIII | | | | 30 | | |
| Compound X | | | | | 20 | 30 |
| UL-94 Burn Results | | | | | | |
| Ave. T1/T2, s | >30, BD/BTC(c) | 3/2(c) | 13/3 | 23/24 | 20/2 | 9/2 |
| Total Burn Time T1/T2, s | N/A | 15/10 | 64/14 | 113/5 | 100/8 | 44/9 |
| Dripping(b) | BD/BTC | BD | BD | BD | BD | none |
| Rating | Fail | V-2 | V-2 | V-2 | V-2 | V-1 |

(a)A 43% Glass - PA66 resin concentrate from DuPont.
(b)BD = Burning Drip: Indicates burning material from the bar ignited the cotton. BTC = burned completely to the clamp.
(c)UL Test on 1/32" thick sample bars.

As evidenced in Table 1, the addition of 30% of Compounds V, VI, or VIII showed FR properties, giving a V-2 rating. The addition of 20 or 30% of the Compound X material also showed flame retardant properties compared with the control (formulation 1) by giving either no drips in combination with reduced burn times, or by reducing the burn times during the test. Formulation 6 was just shy of reaching a V-0 classification.

Example 8

Use of Flame Retardant in Glass-Reinforced PA66 with Melamine or PPE Based Adjuvants Formulations were made as described in Example 7 and the molded bars were tested for flammability as shown in Table 2. Various melamine based materials were also added to the formulations as FR adjuvant compounds to determine the effect on flammability properties. A PPE resin was also tested as an FR adjuvant material in this system. The test bars were subjected to the UL-94 vertical burn test protocol and the average burn times for 5 test bars were noted for both flame applications (T1, T2). The total burn times were also summed for each of the two flame applications across all five test bars along with the observations of any dripping behavior.

TABLE 2

| Formulation | 7 | 8 | 9 | 10 | 11 | 12 | 13 |
|---|---|---|---|---|---|---|---|
| % PA 66 Resin | 0 | 37 | 37 | 42 | 45 | 37 | |
| % Zytel 70G43L Resin(a) | 70.0 | | | | | | 66.6 |
| % Glass | | 30 | 30 | 30 | 30 | 30 | |
| Compound V | | | | | | | 14.2 |
| Compound X | 17 | 17 | 17 | 17 | 20 | 17 | |
| PPE(b) | | | | | | | 11 |
| MP-200(c) | 11 | | | | | | |
| Budit 311(d) | | 11 | | 11 | | | 14.2 |
| Budit 3141(d) | 0 | | 11 | | | | |
| Zinc Borate | 2 | 5 | 5 | | 5 | | 5 |
| UL-94 Burn Results | | | | | | | |
| Ave. T1/T2, s | 4.5/1.8 | 1.2/0.6 | 1.6/1.0 | 9/1 | 17/3 | 31/5 | 3.4/4.6 |
| Total Burn Time T1/T2, s | 25 | 6/3 | 8/5 | 47/3 | 84/10 | 154/25 | 17/23 |
| Dripping(e) | none | none | none | BD | BD | none | BD |
| Rating | V-0 | V-0 | V-0 | V-2 | V-2 | near V-1 | V-2 |

(a)A 43% Glass - PA66 resin concentrate from DuPont.
(b)PPE = PPO 803/808 from GE Plastics (Now Sabic Innovative Plastics).
(c)MP-200 = Melapur 200. Melamine polyphosphate from Ciba.
(d)Budit 3141 = Melamine polyphosphate from Budenheim; Budit 311 = Melamine pyrophosphate from Budenheim.
(e)BD = Burning Drip: Indicates burning material from the bar ignited the cotton. BTC = burned completely to the clamp.

These formulations show an increase in flame retardancy versus the control formulation 1 (Table 1) and, in most cases, actually gave V-0 FR performance when used in combination with the melamine based FR adjuvants. Additionally, using an organic-based char-forming FR-Adjuvant like PPE resin also improved the flame retardancy. In the cases with the melamine compounds, the addition of zinc borate helped to eliminate the drips and gave a V-0 classification.

Example 9

Use of Flame Retardants in Glass-Reinforced PA66 with Clay/LDH Based FR Adjuvants Formulations were made as described in Example 7. A clay, Cloisite 30B from Southern Clay Products, was used as an FR adjuvant to determine its effects on the burn properties. This clay is a quaternary ammonium salt modified natural montmorillonite material. Additionally a zinc-aluminum Zn2Al(OH)6 layered double hydroxide (LDH) material was tested as an adjuvant. The test bars were subjected to the UL-94 vertical burn test protocol and the average burn times for 5 test bars was noted for both flame applications (T1, T2). The total burn times were also summed for each of the two flame applications across all five test bars along with the observations of any dripping behavior. The results are summarized in Table 3.

TABLE 3

| Formulation | 14 | 15 | 16 | 17 | 18 | 19 | 20 |
|---|---|---|---|---|---|---|---|
| % PA 66 Resin | 65 | 50 | 45 | 35 | 35 | 27 | 37 |
| % Glass | 30 | 30 | 30 | 30 | 30 | 30 | 30 |
| Compound VII | | | | | | | 28 |
| Compound IX | | | | | | 38 | |
| Compound X | | 15 | 20 | 30 | 30 | | |
| Clay | 5 | 5 | 5 | 5 | | 5 | 5 |
| LDH | | | | | 5 | | |
| UL-94 Burn Results | | | | | | | |
| Ave. T1/T2, s | 109/0 | 15/4 | 1/2 | 1/1 | 11/5 | 0.3/0.3 | 4/1 |
| Total Burn Time T1/T2, s | 545/0 | 75/19 | 6/11 | 3/4 | 53/25 | 1/1 | 19/6 |
| Dripping(a) | none | none | none | none | none/BD | none | none |
| Rating | Fail | V-1 | V-0 | V-0 | V-2 | V-0 | V-0 |

(a)BD = Burning Drip: Indicates burning material from the bar ignited the cotton.

The data in Table 3 clearly shows the FR benefits of using these types of materials in a resin formulation. Formulation #14, with only clay added as a control, gave no dripping, but had very long burn times. Addition of various levels of Compound X improved the flame retardant properties to V-1, and then to V-0 at a higher load level. The use of other benzylic based polymeric FR materials, Compounds VII and IX, also showed good flame retardant properties, showing the generality of this approach. Using LDH instead of the clay showed some dripping behavior, giving a V-2 classification.

Example 10

Use of Flame Retardants in Unreinforced PA66 Formulations

In order to test the effect of the glass fiber reinforcement and to determine if these materials also exhibit flame retardant properties in the absence of such reinforcement, formulations were made as described above and the molded bars were tested for flammability as shown in Table 4. The test bars were subjected to the UL-94 vertical burn test protocol and the average burn times for 5 test bars was noted for both flame applications (T1, T2). The total burn times were also summed for each of the two flame applications across all five test bars along with the observations of any dripping behavior.

TABLE 4

| Formulation | 21 | 22 |
|---|---|---|
| % PA 66 Resin | 65 | 60 |
| Compound X | 30 | 30 |
| Clay | 5 | 5 |
| Zinc Borate | | 5 |
| UL-94 Burn Results | | |
| Ave. T1/T2, s | 11/6 | 3/4 |
| Total Burn Time T1/T2, s | 56/28 | 13/20 |
| Dripping | none/none | none/none |
| Rating | V-1 | V-0 |

The data in Table 4 demonstrates the utility of these materials as flame retardants in unreinforced resins as well. The addition of zinc borate as FR adjuvant further increased the flame retardant properties from V-1 to V-0.

Example 11

Preparation of DOPO-Methylene-Poly(Phenylene Ether)

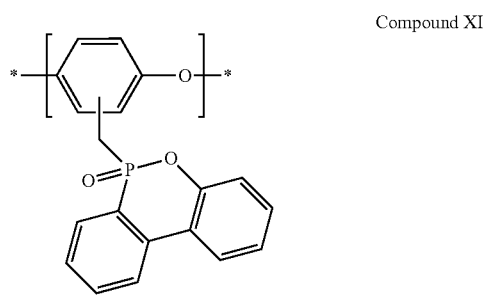

Compound XI

Lithium bis(trimethylsilyl)amide-[LiHMDS] (52 g, 0.31 mol) and THF (220 mL) were added to a 1 L round-bottom flask fitted with an over-head stirrer, temperature probe, addition funnel and reflux condenser. The solution was placed under $N_2$, cooled to 5° C. (ice bath) and 9,10-dihydro-9-oxa-10-phosphaphenanthrene 10-oxide, i.e., DOPO, (70 g, 0.32 mol) was added portion-wise over 10 minutes while maintaining an internal temperature below 10° C. Upon complete addition, bromo-methylated poly(phenylene ether (44 g, 0.27 mol) (as described in Example 3, but with slightly higher molecular weight) in THF (120 mL) was added via addition funnel over 1 hr. During the addition, the internal temperature rose to 25° C. and a yellow/white slurry was obtained. Upon complete addition, the reaction slurry was allowed to stir at room temperature for 16 hours and then concentrated to a solid under reduced pressure. The resulting yellow solid was taken up in methylene chloride (300 mL), washed with $H_2O$, dried, filtered and concentrated to provide an off white solid. This solid was placed in a vacuum oven (210° C., 29 in. Hg) for 3 hours, to provide the title compound (87 g) as a glass after cooling to room temperature.

Example 12

Use of Flame Retardants in Glass-Reinforced PA66

Glass-Reinforced PA66 formulations comprising the flame retardant of Example 11 were compounded and molded as described in Example 7. The UL-94 Vertical Burn Test results are shown in Table 5. This data shows that at certain load levels of FR or adjuvant synergist in combination, a strong flame retardant system can be achieved.

TABLE 5

Testing of Compound XI with Melem in 30% GR PA66.

| Formulations | 23 | 24 | 25 |
|---|---|---|---|
| Polyamide 6,6, % | 55.2 | 45.2 | 42.2 |
| Glass, % | 30 | 30 | 30 |
| Cmpd XI, % | 12.4 | 12.4 | 15.4 |
| DELACAL NFR HP, % | 0 | 10 | 10 |
| Drip & Stabilizer Package[1] | 2.4 | 2.4 | 2.4 |
| UL-94 VBT (1/16") | | | |
| Ave T1/T2, s | 28/— | 15/0 | 2/0 |
| Drips | BB/C[2] | None | None |
| Tot. Burn Time (5 B), sec. | 143 | 77 | 11 |
| Rating | V-2 | V-1 | V-0 |

[1] 0.4% PTFE (Dyneon TF 9205); 2% Surlyn
[2] Burning bar/chunk which separated at the clamp & continued to burn on the chamber floor
DELACAL NFR HP is a multi-component material comprised of the two main homologues melem and melam, available from Delamin, Ltd.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A flame-retardant comprising one or more polymers comprising a unit represented by formula (I), (Ia) or (II):

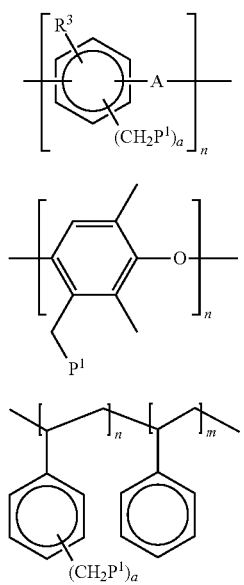

where A is selected from O, S, SO$_2$, a single bond, alkyl, and —CH$_2$—P$^1$;

P$^1$ is a phosphorus-containing group of the formula:

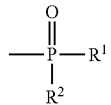

wherein R$^1$ and R$^2$ together with a group Y form a group R$^1$—Y—R$^2$, which together with the phosphorus atom bound to R$^1$ and R$^2$ form a ring:

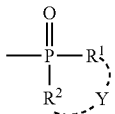

in which R$^1$ and R$^2$ are the same or different and each is selected from O-alkyl, O-aryl, alkyl and aryl, and Y is a linking group selected from direct bond, alkylene and —O—;

R$^3$ is H or alkyl;

each a is an integer individually selected from 0 to 4, provided that at least one a is at least 1; n is an integer from 4 to 100,000, and m is an integer from 0 to 100,000.

2. The flame-retardant according to claim 1 comprising one or more polymers comprising a unit represented by formula (I), or one or more polymers comprising a unit represented by formula (II) wherein m is from 1 to 100,000.

3. The flame-retardant according to claim 1 which comprises one or more compounds comprising a unit represented by formula (Ia) or (II).

4. The flame-retardant according to claim 1 comprising one or more polymers having a formula (VIIa), (VIIb), (VIIIa) or (IXa):

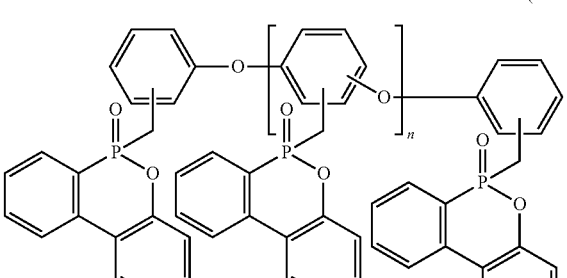

wherein b is 2 or 3

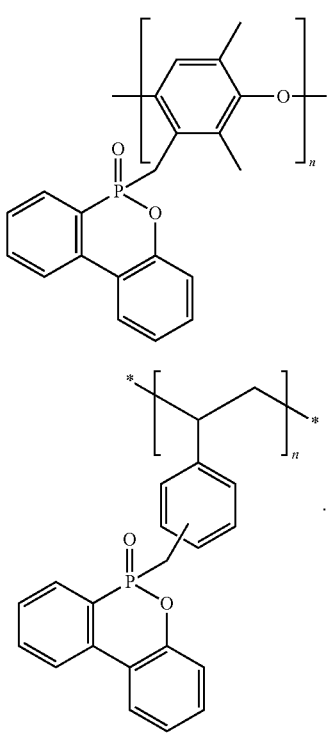

5. The flame-retardant according to claim 4 comprising at least one polymer of formula (VIIa) or (VIIb).

6. The flame-retardant according to claim 4 comprising at least one polymer of formula (VIIIa).

7. The flame-retardant according to claim 4 comprising at least one polymer of formula (IXa).

8. A flame retardant composition comprising a flame retardant according to claim 1 and a base resin selected from the group consisting of polyester resins, styrenic resins, polyamide resins, polycarbonate resins, vinyl resins, olefinic resins, acrylic resins, epoxy resins, blends of two or more of said resins, and blends of one or more of said resins with a polyphenylene oxide-series resin.

9. The flame retardant composition according to claim 8 wherein the base resin comprises a polyamide resin.

10. The flame retardant composition according to claim 8 wherein the flame retardant is present in an amount of from about 10% to about 40% by weight of the total flame-retardant composition.

11. The flame retardant composition according to claim 8 wherein the base resin comprises a polyester resin, styrenic resin, polyamide resin, polycarbonate resin or epoxy resin.

12. The flame retardant composition according to claim 11 wherein the base resin further comprises a glass reinforcing agent.

13. The flame retardant composition according to claim 12 wherein the base resin comprises a glass-filled polyamide resin, comprising from about 15 to about 40% glass by weight of the total weight of the polyamide and glass.

14. The flame retardant composition according to claim 8 further comprising at least one flame retardant adjuvant material selected from melamine condensation products, melamine salts, inorganic metal compounds, clay compounds, layered double hydroxide materials, and polyphenylene ether resins and mixtures thereof.

15. The flame retardant composition according to claim 14, wherein the melamine salt comprises a melamine phosphate, polyphosphate, and/or melamine pyrophosphate.

16. The flame retardant composition according to claim 14, wherein the melamine condensation product comprises one or more of melam, melem or melon.

17. The flame retardant composition according to claim 14 comprising at least one melamine salt and/or melamine condensation product and at least one adjuvant selected from the group consisting of metal oxides, metal hydroxides, clay compounds and layered double hydroxide materials.

18. The flame retardant composition according to claim 14, wherein said at least one flame retardant adjuvant material is present in an amount of about 1 to about 20 wt % of the flame-retardant resin composition.

19. The flame retardant composition according to claim 14, wherein the inorganic metal compound is selected from metal salts of inorganic acids, metal oxides and hydroxides, metal sulfides and mixtures thereof.

20. The flame retardant composition according to claim 19, wherein the inorganic metal compound comprises a borate.

* * * * *